(12) United States Patent
Hansen et al.

(10) Patent No.: US 6,186,173 B1
(45) Date of Patent: Feb. 13, 2001

(54) HYDRAULIC STEERING ARRANGEMENT

(75) Inventors: Charlotte Duus Hansen, Sydals; Tage Christiansen, Nordborg, both of (DK)

(73) Assignee: Danfoss A/S, Nordborg (DK)

(*) Notice: Under 35 U.S.C. 154(b), the term of this patent shall be extended for 0 days.

(21) Appl. No.: 09/486,128

(22) PCT Filed: Aug. 25, 1998

(86) PCT No.: PCT/DK98/00366
§ 371 Date: Feb. 23, 2000
§ 102(e) Date: Feb. 23, 2000

(87) PCT Pub. No.: WO99/10217
PCT Pub. Date: Mar. 4, 1999

(30) Foreign Application Priority Data

Aug. 27, 1997 (DE) ............................................. 197 37 253

(51) Int. Cl.$^7$ ................................................. F15B 13/02
(52) U.S. Cl. ......................... 137/625.23; 91/375 A; 91/375 R; 251/209
(58) Field of Search ..................... 91/375 A, 375 R, 91/467; 137/625.23, 625.21; 251/209

(56) References Cited

U.S. PATENT DOCUMENTS

| | | | |
|---|---|---|---|
| 2,988,059 | * 6/1961 | Wysong, Jr. ........................ 91/375 A |
| 4,471,808 | * 9/1984 | Thomsen et al. ............ 137/625.23 X |
| 4,471,809 | * 9/1984 | Thomsen et al. ............ 137/625.23 X |
| 4,582,087 | * 4/1986 | Sorensen et al. ................ 137/625.21 |
| 4,651,776 | * 3/1987 | Nakano et al. .................. 137/625.69 |
| 4,779,646 | * 10/1988 | Vincent ........................... 91/375 A X |
| 5,259,413 | * 11/1993 | Harpole et al. ................. 91/375 A X |
| 5,458,153 | * 10/1995 | Roeske ............................ 91/375 A X |

* cited by examiner

*Primary Examiner*—John Rivell
*Assistant Examiner*—Meredith H. Schoenfeld
(74) *Attorney, Agent, or Firm*—Lee, Mann, Smith, McWilliams, Sweeney and Ohlson

(57) ABSTRACT

The invention concerns a hydraulic steering arrangement (1) with an adjustable throttle, which has an internal rotary slide (2) with internal steering openings (4) in its circumferential wall and rotatable in relation to this, an external rotary slide (3) with external steering openings (7, 10) in its circumferential wall (8). The production of such steering arrangements must be inexpensive, yet a jamming during operation must be avoided. For this purpose, each of the external steering openings is made by a substantially radially extending bore (7), which penetrates part of the circumferential wall (8), and a following section (10) with reduced flow cross section.

10 Claims, 1 Drawing Sheet

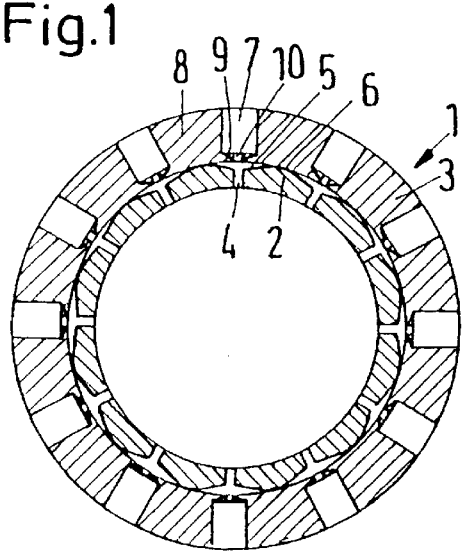
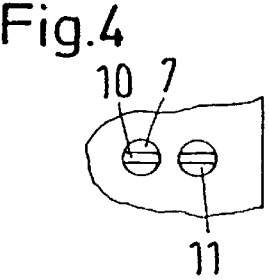
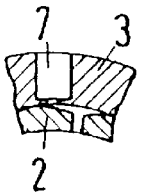
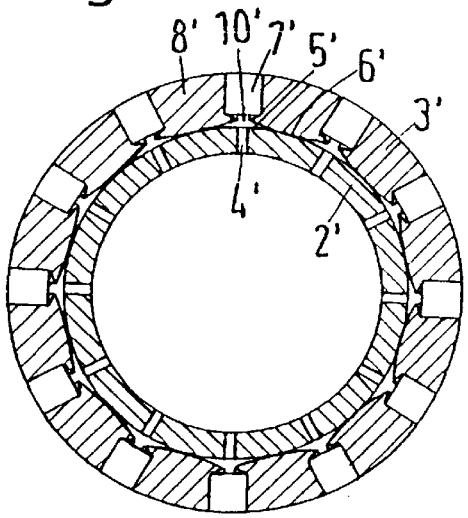
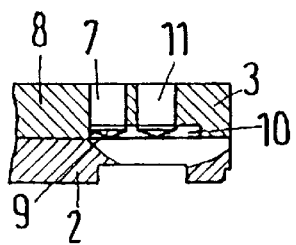
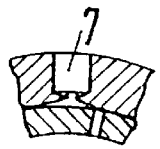

HYDRAULIC STEERING ARRANGEMENT

The invention concerns a hydraulic steering arrangement with an adjustable throttle, which has an internal rotary slide with internal steering openings in its circumferential wall and, rotatable in relation to this, an external rotary slide with external steering openings in its circumferential wall.

Such a hydraulic steering arrangement is, for example, known from DE 31 26 040 A1. Here the steering openings are shaped as grooves in the circumferential walls of the individual rotary slides, which grooves extend from a front side of the rotary slide. In the neutral position these grooves are overlapping each other. In this connection, broadenings of the steering openings of the internal rotary slide are provided, which broadenings are arranged on the outside of the internal rotary slide. This results in variable flow resistances, when the rotary slides are turned in relation to each other. The more the two rotary slides are turned in relation to each other, the more the flow resistance increases. Such steering arrangements are, for instance, used in hydraulic steering units. If, as in the state of the art, the steering openings are lying opposite each other in the neutral position, thus causing the lowest pressure drop, an "open centre" unit is concerned.

On the one hand, the two rotary slides are rotatable in relation to each other. On the other hand the unit comprising the two rotary slides is also rotatable in a housing, for example to determine the pressure and the direction of the hydraulic fluid in such a steering unit.

In this connection the problem occurs that the external rotary slide gets jammed in the housing, for example when the pressure inside the rotary slide gets too high. Among things, this is caused by the fact that one axial end of the external rotary slide is weakened by the grooves forming the steering openings. Between the grooves there are "legs", which are only fixed at one end, so that they will spread when acted upon by a pressure.

To remedy this problem, DE 33 02 001 A1 suggests that the end of the rotary slide is provided with an additional ring, so that again both ends of the "legs" are fixed, and an expansion is only possible in the middle of the "legs". This procedure has in fact to a high degree defused the problem. However, it requires an additional production step, namely the fixing of the ring, which makes the production more expensive.

It is the purpose of the invention to develop a steering arrangement further, so as to make the production more profitable, yet still avoiding the jamming.

In a hydraulic steering arrangement of the kind mentioned in the introduction this problem is solved according to the invention in that each of the external steering openings is a substantially radially extending bore, which penetrates part of the circumferential wall, and a following section with reduced flow cross section.

This embodiment offers several advantages: The bores are relatively simple to make during production. It is sufficient to place a boring tool on the radial outside and to make the bore. However, at least one path will remain on the external steering slide in the area of its front end next to the steering openings. This path is the area between the front end and the beginning of the bore. This means that there is no severing of the rotary slide in this area, meaning that here the rotary slide cannot expand. Thus the fitting of an additional component is not required. As the bore is followed by a section with reduced flow cross section, the bore can have a relatively large diameter, meaning that the diameter can be larger than the width of the grooves in the steering arrangements known till now. Surprisingly, this has led to the result that the throttle characteristic of the steering arrangement has a lower viscosity dependence than the steering arrangements known till now. The reason for this is that the hydraulic fluid must only travel a relatively short way through a narrow area, which is less critical with regard to the viscosity dependence of the flow resistance. Additionally, this embodiment offers a lower pressure drop in the neutral position, which again leads to less noise. Thus, the result is not only a simplified production, but also an improved operational behaviour, the latter caused by the constructive embodiment.

Preferably, the bore is a cylinder bore with constant cross section and conical top. Thus a quite normal drill can be used, and special tools are not required. Through the selection of the bore diameter the flow resistance can be predetermined relatively accurately and repeatably.

Preferably, the section with reduced flow cross section is formed by a groove extending on the inside of the circumferential wall. Such a groove can be made with a relatively small width, as it does not have to be very deep. Both sides of the groove are then joined by the remaining inside of the circumferential wall, which forms a sealing zone together with the outside of the circumferential wall of the internal rotary slide. The width of the groove can be smaller than in the state of the art. However, it can also remain exactly as wide, as it will then cause a lower flow resistance in the neutral position. The throttle effect then occurs, as also in the state of the art, through a partial covering of the steering openings by the other rotary slide. This steering characteristic is then to a large extent maintained, so that the new steering arrangement can also be fitted in existing hydraulic plant or used as spare parts.

Preferably, the groove extends in the axial direction. This gives a symmetrical operation behaviour, meaning that the same throttle effects will occur in both relative rotation directions of both rotary slides.

Preferably, the groove extends at least in one direction further than the diameter of the bore. Through a dimensioning of this groove, for instance selecting height, width and length of the groove, the throttle effect can be determined, which will be caused by a total or partial covering of the groove by the internal rotary slide. As the dimensions of the groove can easily be changed, this gives a high production flexibility.

In a particularly preferred embodiment it is provided that the cross section of the section with reduced flow cross section expands from the start of the bore towards the inside of the circumferential wall. If a groove is used, it will expand. Now, the section with reduced flow cross section can at the same time be used for changing the throttle characteristic on the relative turning of the two rotary slides. As the embodiment with a groove will anyway require a working of the inside of the circumferential wall of the external rotary slide to produce the groove, it is not difficult at all also to provide an additional widening of the groove. The same applies in a similar way for other embodiments of the section with reduced flow cross section.

In this connection it is advantageous that the steering openings of the internal rotary slide penetrate the circumferential wall with a shape that remains unchanged. A working of the outside of the circumferential wall of the internal rotary slide is no longer required. The throttle characteristic resulting from the turning of both rotary slides in relation to each other is then exclusively caused by the expansion of the section with reduced flow cross section, for instance the widening of the groove. This simplifies the production.

Preferably, the section with reduced flow cross section is milled. This production method is particularly suitable for the forming of a groove. As the groove does not have to be very deep, the milling is rather easy to perform. As the cutter can be short in this case, the groove can be made very accurately.

In an alternative embodiment the section with reduced flow cross section is shaped into the circumferential wall by spark erosion. This way of production is always appropriate, when a complicated shape is concerned, for instance when the section with the reduced flow cross section expands in the direction of the inside of the circumferential wall of the external rotary slide.

Advantageously, an additional similar bore is arranged next to the bore in the axial direction. Thus the throttle resistance in the neutral position is further decreased. The bore is similar to the one described above, that is, it is also followed by a section with reduced flow cross section. Of course, the number of bores can also exceed two.

In the following the invention is described on the basis of preferred embodiments in connection with the drawings, showing:

FIG. 1 a first embodiment of a hydraulic steering arrangement in the neutral position FIG. 2 a share of the steering arrangement in the throttle position FIG. 3 an axial section in part view FIG. 4 top view of the outside of an external rotary slide FIG. 5 a steering arrangement of a second embodiment corresponding to the presentation in FIG. 1

FIG. 6 the steering arrangement in FIG. 5 shown like in FIG. 2.

A steering arrangement 1 has an internal rotary slide and an external rotary slide 3, which are rotatable in relation to each other from the neutral position shown in FIG. 1 into the maximum throttle position shown in FIG. 2. Of course, also a rotation in the opposite direction is possible.

The internal rotary slide 2 has steering openings, which are made as grooves 4, which expand in the direction of the outside of the circumferential wall of the rotary slide 2, where they form recesses 5. Next to the recesses 5 in the circumferential direction there is a sealing area 6 on which the internal rotary slide 2 bears on the external rotary slide 3.

In this connection the grooves 4 of the internal rotary slide 2 extend from a front side of the rotary slide 2 in a manner not shown.

The external rotary slide 3 also has steering openings, which are in the present case formed by cylinder bores 7, which penetrate part of the circumferential wall 8 of the rotary slide 3 with a constant diameter. At the inner end the bore 7 has a conical top 9.

In the area of this conical top 9, a groove 10 is made extending in the axial direction into the inside of the circumferential wall 8 of the external rotary slide 3. This groove 10 is so deep that it opens into the bore 7. The width of the groove 10 is smaller than the diameter of the bore 7. Therefore, it forms a section with a reduced flow cross section.

In the axial direction, next to the bore 7, there is a similar bore 11. The groove 10 extends across this bore 11 and also opens into the bore 11.

In the neutral position shown in FIG. 1 the groove 10 of the external rotary slide 3 lies opposite to the groove 4 of the internal rotary slide 2. Due to the relatively large diameter of the bore 7 and the correspondingly large diameter of the bore 11, there is only a relatively small pressure drop for the hydraulic fluid when passing the external rotary slide 3. The pressure drop on the internal rotary slide 2 is comparable with that of a traditional steering arrangement. In total however, this results in a lower pressure drop and thus less noise in the neutral position. Additionally, this embodiment reduces the viscosity dependence of the throttling.

A rotation of the internal rotary slide 2 in relation to the external rotary slide 3 (or vice versa) will cause a reduction of the depth of the recess 5 in the area lying opposite to the groove 10. An increasing rotation angle will thus also increase the throttle resistance. With this embodiment the throttle resistance is substantially determined by the depth of the recess 5 in each individual position. In the zone next to the neutral position the recess 5 still has a relatively large depth, so that it is not of very large importance if both rotary slides 2, 3 are not exactly in the neutral position. The throttle still has practically the same resistance than in the exact neutral position.

The production of the steering arrangement is relatively simple. While the internal rotary slide 2 can be produced as usual, that is, under formation of grooves extending from one front end, the formation of steering openings in the external rotary slide merely requires bores 7, 11 from the radial outside into the circumferential wall 8 of the external rotary slide 3. Further, it is necessary to produce the grooves 10. Both bores and grooves can be made with traditional tools, give no severe problems and offer sufficient accuracy. However, the external rotary slide does not loose firmness in this process, meaning that a jamming in a housing (not shown), in which the external rotary slide is rotatably encased, is more unlikely.

The groove 10 cannot only be made by milling, it can also be made in a spark erosion process.

Such a production process is particularly suited for the embodiment shown in FIGS. 5 and 6. Corresponding parts are provided with dashed reference numbers.

The internal rotary slide 2' no longer has recesses on its circumference. On the contrary it is made with cylinder shape, when disregarding the grooves 4.

The recesses 5' have now been moved to the external rotary slide 3'. They are made in that the groove 10' extends in the direction of the inside of the circumferential wall 8' of the external rotary slide 3'. Thus the function will remain the same, namely the more or less comprehensive covering of the opening of the groove 4 through the more or less deep recess 5', the depth of this recess depending on the rotation angle.

Otherwise, the embodiment according to the FIGS. 5 and 6 correspond to that of the FIGS. 1 to 4, that is, the steering openings in the external rotary slide 3' are made as bores 7' extending into the groove 10'.

Also here the production of the bores 7' are made with ordinary drills with conically extending top, and the formation of the groove 10' with the following expansion, which later forms the recess 5', takes place through spark erosion. Thus, the sealing area 6' will occur between the recesses 5' on the inside of the external slide 3'.

What is claimed is:

1. Hydraulic steering arrangement with an adjustable throttle, having an internal rotary slide with internal steering openings in its circumferential wall and, rotatable in relation to the internal rotary slide, an external rotary slide with external steering openings in its circumferential wall, each of the external steering openings comprising a substantially radially extending bore which penetrates part of the circumferential wall of the external rotary slide and a following section with reduced flow cross section.

2. Steering arrangement according to claim 1, in which the bore is a cylinder bore with constant cross section and conical top.

3. Steering arrangement according to claim 1, in which the section with reduced flow cross section is formed by a groove extending on the inside of the circumferential wall.

4. Steering arrangement according to claim 3, in which the groove extends in an axial direction.

5. Steering arrangement according to claim 3, in which the groove extends at least in one direction further than the diameter of the bore.

6. Steering arrangement according to claim 1, in which the cross section of the section with reduced flow cross section expands from the start of the bore towards the inside of the circumferential wall of the external rotary slide.

7. Steering arrangement according to claim 6, in which the steering openings of the internal rotary slide penetrate the circumferential wall of the internal rotary slide with a shape that remains unchanged.

8. Steering arrangement according to claim 1, in which the section with the reduced flow cross section is milled.

9. Steering arrangement according to claim 1, in which the section with reduced flow cross section is shaped into the circumferential wall by spark erosion.

10. Steering arrangement according to claim 1, in which an additional similar bore is arranged in the external rotary slide next to the bore in an axial direction.

* * * * *